United States Patent [19]

Frushour

[11] Patent Number: 5,190,734
[45] Date of Patent: Mar. 2, 1993

[54] MODIFIED END ASSEMBLY FOR HIGH PRESSURE, HIGH TEMPERATURE REACTION VESSELS

[76] Inventor: Robert H. Frushour, P.O. Box 818, Plymouth, Mich. 48170

[21] Appl. No.: 660,332

[22] Filed: Feb. 22, 1991

[51] Int. Cl.$^5$ ............................. B01J 3/00; B28B 3/00
[52] U.S. Cl. .................................... 422/242; 423/446; 425/77
[58] Field of Search ....................... 422/242; 423/446; 425/77

[56] References Cited

U.S. PATENT DOCUMENTS

| | | | |
|---|---|---|---|
| 2,941,248 | 6/1960 | Hall | 425/77 |
| 2,992,900 | 7/1961 | Bovenkerk | 423/446 |
| 3,088,170 | 5/1963 | Strong | 425/77 |

Primary Examiner—Robert J. Warden
Assistant Examiner—Christopher Y. Kim
Attorney, Agent, or Firm—Basile and Hanlon

[57] ABSTRACT

An end cap apparatus for high pressure, high temperature reaction vessels having a reaction chamber containing a reaction charge includes a single member disposed in registry with the reaction charge in the reaction chamber which is formed of at least two or more materials, at least one of which is electrically conductive, and at least one of which is non-conductive to both heat and electricity. In a preferred embodiment, the member is formed of a mixture of graphite and an alkali halide salt. In certain applications, an outer, non-conductive ceramic member surrounds and supports the inner member.

10 Claims, 2 Drawing Sheets

MODIFIED END ASSEMBLY FOR HIGH PRESSURE, HIGH TEMPERATURE REACTION VESSELS

BACKGROUND OF THE INVENTION

1. Field of the Invention

This invention relates to reaction vessels that are subjected to ultrahigh pressures and high temperatures and, more particularly, a replacement for prior art end cap assemblies, resulting in a more controllable and thermally balanced capsule.

2. Description of the Art

A reaction vessel may generally be described, within the scope of this invention, as a vessel or capsule within which there is positioned a given specimen material to be subjected to high pressure/high temperature conditions for research study or for manufacture of useful materials or articles. Similar prior art reaction vessels of the belt type and the cubic type have been described in numerous patents and more specifically in U.S. Pat. Nos. 2,941,241 to Strong; 2,941,248 to Hall; 2,992,900 to Bovenkerk; and 3,088,170 to Strong, together with suitable apparatus for the application of the pressures involved. Generally, an ultrahigh pressure/high temperature reaction vessel is adapted to undergo considerable deformation; for example, when placed in a confining apparatus or enclosure such as a defined belt or chamber, and then subjected to compression by suitable moving members. While such reaction vessels have been used for years for both research and manufacturing purposes, there has been considerable difficulty in obtaining precise control over the temperature of the reaction components due to the deformation of the end assemblies during compression at ultrahigh pressures.

Accordingly, it would be desirable to provide an improved reaction vessel. It would also be desirable to provide an improved end assembly for a reaction vessel of the belt type or the cubic type.

SUMMARY OF THE INVENTION

A conventional end assembly for an ultrahigh pressure/high temperature reaction vessel includes a steel current ring (which acts as an extension of the tungsten carbide anvil), a pyrophyllite or other ceramic pill, and a metal end disc. The present invention replaces these components with a single inner member or pill which contacts the reaction charge in the vessel and is formed of two or more materials; at least one of which is electrically conductive and the other of which is non-conductive to heat and electricity. Preferably, the inner member or pill is formed of a mixture of an alkali halide salt and graphite. The inner pill is composed of a deformable material that applies uniform pressure to the graphite/catalyst or other capsule charge and restricts heat loss to the tungsten carbide anvils by way of radiation or conduction.

In belt-type high pressure apparatus, a ceramic annular component is provided surrounding an electrically-conducting, high-insulating inner pill. The stiff ceramic outer ring, unlike the steel ring it replaces, does not have high hoop tensile strength and, during and after compression in the high pressure apparatus, the tensile strength of this material is essentially zero. The ring, however, has good compressive strength characteristics and has excellent resistance against extrusion.

BRIEF DESCRIPTION OF THE DRAWING

This invention will be better understood when taken in connection with the following description and the drawings in which.

DESCRIPTION OF THE PREFERRED EMBODIMENTS

Figure 1:
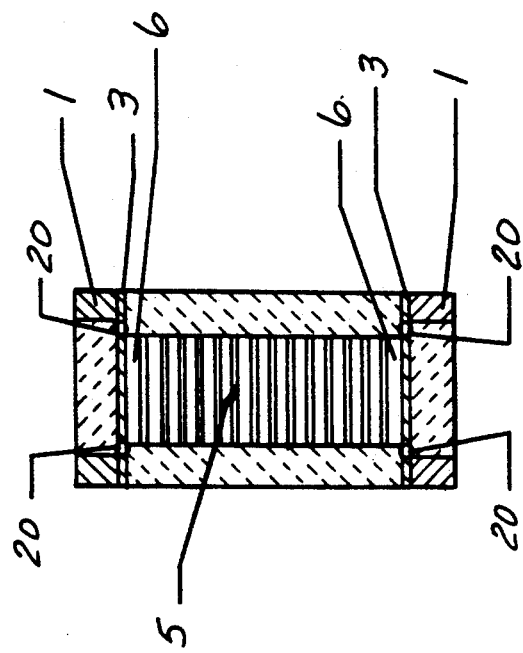
FIG. 1 is a cross sectional view of a prior art reaction vessel within a belt-type high pressure apparatus.
Figure 2:
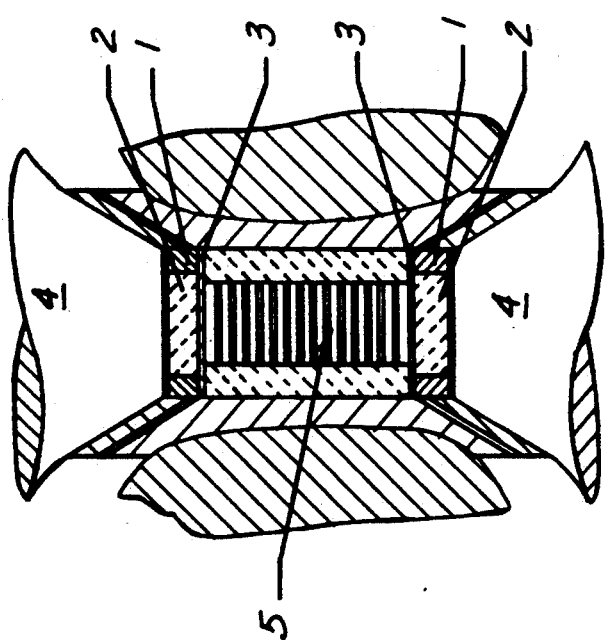
FIG. 2 is an enlarged cross sectional view of the inner portion of the prior art reaction vessel illustrated in FIG. 1.

Descriptions of prior art reaction vessels can be found throughout the literature and by studying various patents on diamond synthesis. More specifically, U.S. Pat. No. 2,992,900 to Bovenkerk describes reaction vessels for which modification by the present invention is particularly suited. A reaction vessel of this type is shown in FIG. 1 positioned within a belt-type high pressure apparatus. The end cap assembly in this design incorporates a hardened steel annular component 1, a pyrophyllite or other ceramic pill 2, and a metal end disc 3. The function of this ring-pill-disc assembly is to insulate the metal anvils 4 from the heat generated in the reaction zone 5 while, at the same time, providing a conductive path for electrical current to flow through the charge or heater element to create thermal energy for the necessary reaction to occur. This type of reaction vessel shown enlarged in FIG. 2 is prone to failure of the metal end disc 3 in a zone A between the steel current ring 1 and the graphite disc 6. During compression, the metal end disc 3 becomes significantly deformed in this zone and, during heating, high current then flows through this thinner metal component. The result is often partial melting and structural failure of the metal end disc 3. Because of this, the temperature of the reaction vessel is difficult and sometimes impossible to control.

It is very important for the metal end disc 3 to be as thin as possible, so that heat flow by conduction back to the anvils 4 is minimized. Heat loss through the end disc 3 causes an imbalance in the temperature of the reaction components, weakening of the steel current ring 1 component, and poor service life for the anvils 4. Although this is somewhat controlled by choosing a very thin metal end disc 3; the unfavorable trade-off is that the thinner disc becomes very hot and can soften or melt, which causes further deformation thinning and the potential for complete punch through of the disc 3 by the reaction charge, thus interrupting the flow of electrical current. Even in the normal situation, non-uniform heating occurs on each end of the reaction charge, since one end disc does not deform at the exact same rate, time, or amount as the other. All capsule components are controlled as closely as possible in material composition and dimensional tolerances; however, no two capsule assemblies are exactly alike, and thus, the deformation of individual components varies from cycle to cycle. Since the metal end disc 3 is already thin to start with, even minute changes in its thickness during the reaction cycle cause significant differences in internal capsule temperatures. This is problematic. Production of some high pressure/high temperature products, such as coarse diamond powders used for concrete sawing applications, require very careful control (plus or minus one percent) of reaction component temperature during the manufacturing cycle. Larger temperature fluctuations cause the formation of black and/or highly included diamond crystals. These poorly formed crystals are not suitable for sawing applications where high strength metal bonded diamond saw blades are used to cut stone, granite, concrete, or other aggregate materials.

The foregoing problems can be eliminated by replacing the thin metal disc 3 and pyrophyllite pill 2 with a thick electrically-conductive, heat-insulating pill. This replacement was believed to be difficult, since the steel ring 1, which acts as an extension of the tungsten carbide anvil 4, was thought to be required for structural integrity in the capsule design. The steel ring 1 creates a problem since it is an excellent heat conductor and reduces the advantage of using an electrically-conductive pill in place of the prior art pyrophyllite pill. It has been discovered that a ring 1 with high hoop tensile strength is not required, and the problem is at once solved by replacing the steel ring 1 with a hard-fired ceramic material.

Figure 3:
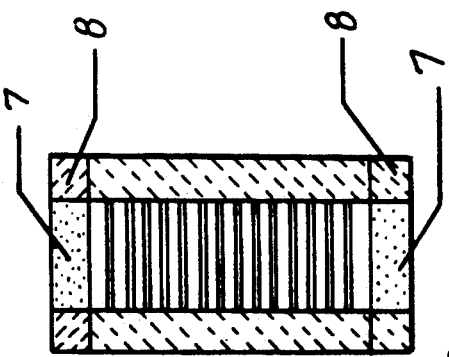
FIG. 3 is a cross sectional view of the inner portion of the reaction vessel of FIG. 1, employing the improved end assembly in accordance with the teachings of this invention.

Referring now to FIG. 3, the electrical current flows through the reaction vessel by way of a relatively thick, electrically-conducting inner member or pill 7 of the present invention. The pill 7 is confined by an optional annular member or ceramic ring 8 so that during compression, the pill 7 remains relatively intact. The electrical resistance of the pill 7 actually decreases during compression, since its density increases while the overall length decreases. When reaction cells are used for purposes of manufacturing synthetic diamond, the reduction of electrical resistance in the end assemblies is favorable, since this partially offsets the increase in electrical resistance caused by converting graphite to diamond. This is the opposite of the situation with a metal end disc 3 used in FIGS. 1 and 2. The metal end disc 3 becomes deformed, the cross sectional area becomes thinner, and it chemically reacts during the high pressure/high temperature cycle, all of which cause an increase in electrical resistance and excessive heat production outside the diamond cell. Graphite-to-diamond conversion also causes a sharp increase in electrical resistance. These competing resistance changes make it very difficult to control the reaction temperature.

The inner member or pill 7 is preferably formed of a mixture of two or more components or materials which provide the desired electrically-conductive and, also, the heat-insulating properties. Thus, the inner member or pill 7 is composed of two or more materials of at least one of which is electrically conductive and at least one of which is non-conductive to both heat and electricity. The conductive component of the pill 7 is selected from the group consisting of graphite, carbon, iron, chrome, nickel, copper, molybdenum, tantalum, and zirconium, and mixtures thereof. The non-conductive component of the pill 7 is preferably formed of one or more of pyrophyllite, catlinite, talc, silica, aluminum oxide, magnesium oxide, NaCl, AgCl, KCl, KBr, AgBr, CsCl, $CuBr_2$, $Ag_2SO_4$, and mixtures thereof.

In a preferred embodiment, the pill 7 is generally formed of an alkali halide salt mixed in predetermined portions with graphite for the purpose of conducting electricity and blocking heat flow within the reaction vessel. Such components preferably comprise 5 to 95 weight percent graphite and 95 to 5 weight percent alkali halide salt.

The non-heat conductive outer member or ring 8 is selected from the group consisting of pyrophyllite, catlinite, talc, silica, aluminum oxide, and magnesium oxide, and mixtures thereof. The pyrophyllite or other material should be fired in a kiln to at least 700° C. for at least one hour.

It is anticipated that for some reaction vessels it may still be necessary to have a metal annular component that surrounds either the ceramic ring 8, the inner pill 7, or both, in order to prevent further deformation or extrusion of the soft inner pill 7 during the cold compression portion of the cycle. In the case of using a metal ring adjacent to the inner pill 7, it must be thin enough to prevent conduction of significant heat to the anvils during the heating portion of the cycle.

Figure 4:
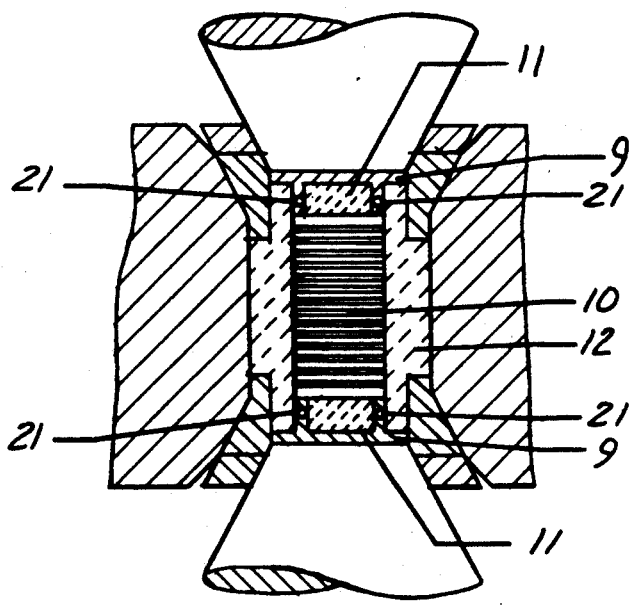
FIG. 4 is a cross sectional view of another embodiment of a prior art reaction vessel within a belt-type high pressure apparatus.

FIG. 4 shows yet another design for a conventional reaction vessel used in a belt-type high pressure apparatus. The steel end plug 9 provides a means for conducting electrical current to the reaction charge 10 while, at the same time, blocking heat flow back to the anvils by way of the ring portion of this component shown at B. The pill 11 and the outer sleeve 12 are composed of pyrophyllite, or other ceramic, and provide both electrical and heat insulation within the reaction vessel.

Figure 5:
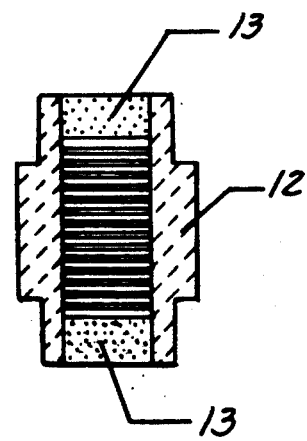
FIG. 5 is a cross sectional view of the inner portion of the reaction vessel of FIG. 4, modified according to teachings of this invention.

FIG. 5 is the reaction vessel of FIG. 4 modified to use an electrically-conductive, heat-insulating pill 13 of the present invention in place of the ring portion of the steel end plug 9 and the pyrophyllite pill 11. This modification greatly improves the heat balance of the reaction vessel because electrical current is distributed uniformly over the entire surface of the reaction charge and eliminates the possibility of non-uniform heating and potential blow-out due to deformation and melting of the steel end plug 9 at B.

In this embodiment, the pill 13 is formed of a mixture of components or materials which provide the desired electrically-conductive and, also, the heat-insulating properties. The conductive component of the pill 13 is preferably formed of one or more of graphite, carbon, iron, chrome, nickel, copper, molybdenum, tantalum, and zirconium, and mixtures thereof. The non-conductive component of the pill 13 is preferably formed of one or more of pyrophyllite, catlinite, talc, silica, aluminum oxide, magnesium oxide, NaCl, AgCl, KCl, KBr, AgBr, CsCl, $CuBr_2$, $Ag_2SO_4$, and mixtures thereof.

In a preferred embodiment, the pill 13 is generally formed of an alkali halide salt mixed in predetermined portions with graphite for the purpose of conducting electricity and blocking heat flow within the reaction vessel. Such components preferably comprise 5 to 95 weight percent graphite and 95 to 5 weight percent alkali halide salt.

Figure 6:
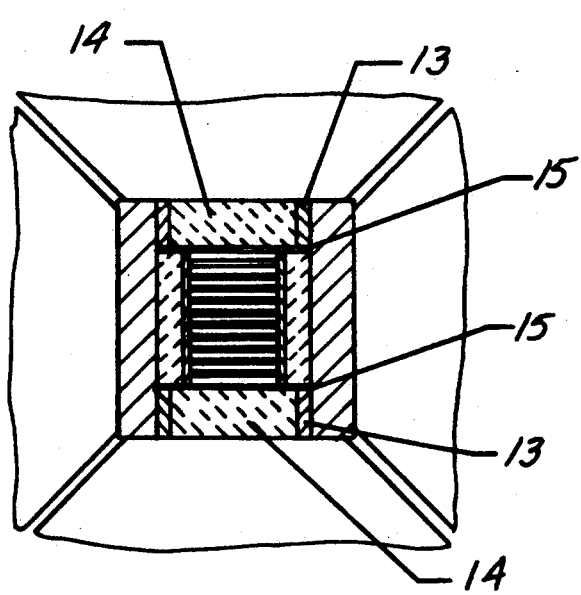
FIG. 6 is a cross sectional view of yet another embodiment of a prior art reaction vessel within a cubic-type high pressure apparatus.
Figure 7:
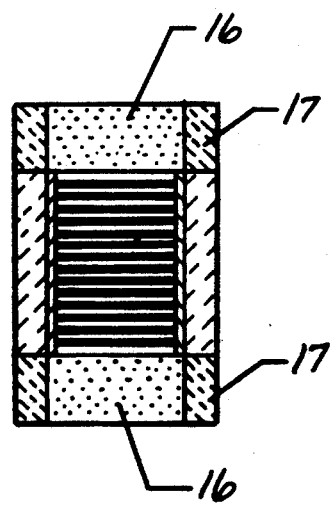
FIG. 7 is an enlarged cross sectional view of the inner portion of the reaction vessel of FIG. 6, modified using teachings of this invention.

FIG. 6 depicts a prior art reaction vessel designed for use in a cubic-type high pressure apparatus. The steel ring 13, the ceramic pill 14 and the end disc 15 function similarly to the ring 1, the pill 2, sand the end disc 3 used in the belt apparatus described above. The problems associated with using this end assembly are the same as for the belt high pressure apparatus and the teachings of this invention can also be used to improve the performance of the cubic reaction vessel. FIG. 7 shows the cubic reaction vessel modified in accordance with this invention utilizing a conductive pill 16 and a non-conductive ring 17 to replace the ring 13, the pill 14 and the end disc 15.

In the embodiment shown in FIG. 7, the conductive pill 16 is formed in a similar manner and of the same components or materials as that described above for the inner member or pill 7 shown in FIG. 3. The non-conductive ring or outer member 17 is formed in substantially the same manner as the outer member or ring 8 described above and shown in FIG. 3.

Several examples will now be presented showing the fabrication of the electrically-conductive, heat-insulating pill or inner member of the present invention.

EXAMPLE NO. 1

A first example of this invention used for a reaction vessel in a belt-type apparatus replaces the AISI 4130 steel ring, hardened to 50 Rockwell C, with a grade A pyrophyllite ring that has been fired in a kiln to 850° C. for at least one hour and, preferably, four hours. The inner pyrophyllite pill is replaced with a pill composed of 25 weight percent −170 U.S. mesh NaCl and 75 weight percent 200–400 U.S. mesh graphite powder. The graphite-salt pill is pre-pressed at 30 tons force. For this experiment, the nichrome metal end disc is discarded and a layered graphite/catalyst charge comes in direct contact with the graphite-salt pill.

EXAMPLE NO. 2

In a second example, a reaction vessel for a belt-type apparatus is modified by eliminating the steel ring portion of the soft, low carbon steel end plug and replacing this, along with the fired pyrophyllite inner pill, with a pre-compressed graphite-salt pill composed of 60 weight percent −20 U.S. mesh graphite powder and 40 weight percent 170/230 U.S. mesh KBr powder.

What is claimed is:

1. An end assembly for use in a belt or cubic high pressure, high temperature reaction vessel having a reaction chamber containing a reaction charge and anvils mounted on opposite ends of the reaction chamber, the end assembly comprising:
   a one piece member disposed between and in contact with a reaction charge in a reaction chamber of a reaction vessel and one of the anvils and composed of a mixture of two or more materials, at least one of which is electrically conductive, and at least one of which is non-conductive to heat and electricity.

2. The end assembly of claim 1 wherein:
   the one piece member is formed of a mixture of an alkali halide salt and graphite.

3. The end assembly of claim 2 wherein the one piece member comprises 5 to 95 weight percent graphite and 95 to 5 weight percent alkali halide salt.

4. The end assembly of claim 1 wherein the nonconductive material is selected from the group consisting of NaCl, AgCl, KCl, KBr, AgBr, CsCl, $CuBr_2$, $Ag_2SO_4$, silica, talc, pyrophyllite, catlinite, aluminum oxide, magnesium oxide, and mixtures thereof.

5. The end assembly of claim 1 wherein the conductive material is selected from the group consisting of graphite, carbon, iron, chrome, nickel, copper, molybdenum, tantalum, and zirconium, and mixtures thereof.

6. The end assembly of claim 1 further comprising:
   an outer, heat-insulative, non-electrically conductive member surrounding the one piece member disposed in contact with the reaction charge for blocking the outward flow of heat from the reaction chamber.

7. The end assembly of claim 6 wherein the outer member is selected from the group consisting of pyrophyllite, catlinite, talc, silica, aluminum oxide, and magnesium oxide, and mixtures thereof.

8. The assembly of claim 7 wherein the material forming the outer member is an at least 700° C., at least one hour, kiln fired material.

9. In a belt or cubic high pressure, high temperature reaction vessel having a hollow, cylindrical reaction chamber containing a reaction charge, anvils mounted on opposite ends of the reaction chamber and movable toward each other to apply pressure to the reaction charge, and an end assembly disposed between at least one of the anvils and the reaction charge for insulating the at least one anvil from heat generated in the reaction chamber, wherein the improvement comprises:
   a one piece member disposed between and in contact with the reaction charge in the reaction vessel and the at least one of the anvils; and
   the one piece member being formed of a mixture of two or more materials, at least one of which is electrically conductive, and at least one of which is non-conductive to heat and electricity.

10. The improvement of claim 9 further comprising:
    an outer, heat-insulative, non-electrically conductive member mounted on an end of the reaction chamber and surrounding the one piece member for blocking the outward flow of heat from the reaction chamber.

* * * * *